United States Patent [19]
Sitters et al.

[11] Patent Number: 5,799,076
[45] Date of Patent: Aug. 25, 1998

[54] TELECOMMUNICATION SYSTEM FOR PROVIDING STATUS INFORMATION OF CONNECTED PARTIES HAVING ASSOCIATED PARTY PROCESSSES

[75] Inventors: Richard J. Sitters, Hilversum; Cornelis A. M. Oerlemans, Maarssen, both of Netherlands

[73] Assignee: U.S. Philips Corporation, New York, N.Y.

[21] Appl. No.: 932,519

[22] Filed: Sep. 18, 1997

Related U.S. Application Data

[63] Continuation of Ser. No. 573,741, Dec. 18, 1995, abandoned.

[30] Foreign Application Priority Data

Dec. 19, 1994 [EP] European Pat. Off. ............ 94203672

[51] Int. Cl.⁶ ........................................ H04M 3/22
[52] U.S. Cl. .................. 379/229; 379/93.15; 379/232; 370/466; 370/467
[58] Field of Search .................... 379/229, 230, 379/231, 232, 233, 234, 156, 157, 201, 202, 265, 266, 309, 219, 220, 221, 207, 198, 93.15; 370/259, 260, 270, 466, 467

[56] References Cited

U.S. PATENT DOCUMENTS

| | | | |
|---|---|---|---|
| 4,928,304 | 5/1990 | Sakai | 379/207 |
| 5,099,510 | 3/1992 | Blinken, Jr. et al. | 379/202 |
| 5,291,492 | 3/1994 | Andrews et al. | 379/157 |
| 5,315,647 | 5/1994 | Araujo | 379/265 |
| 5,373,549 | 12/1994 | Bales et al. | 379/202 |
| 5,396,548 | 3/1995 | Bayerl et al. | 379/202 |
| 5,404,398 | 4/1995 | Domoto et al. | 379/220 |
| 5,414,762 | 5/1995 | Flisik et al. | 379/198 |
| 5,475,747 | 12/1995 | Bales et al. | 379/202 |
| 5,495,522 | 2/1996 | Allen et al. | 379/201 |
| 5,533,109 | 7/1996 | Baker | 379/201 |

OTHER PUBLICATIONS

English Translation of "CSTA–Computer Supported Telecommunications Applications", Uwe Gleinig, Peter Redemann, Lutz Winkler, Nachrichtentech., Elektron., Berlin 42 (1992).

*Primary Examiner*—Krista Zele
*Assistant Examiner*—Scott Wolinsky
*Attorney, Agent, or Firm*—Jack D Slobod

[57] ABSTRACT

A telecommunication system including a telecommunication exchange and a controller for establishing and controlling connections between parties directly coupled to the telecommunication exchange. The controller establishes party processes associated with the parties and the party processes are established after at least two parties are directly coupled to said telecommunication exchange. The system also establishes signaling messages which are exchangeable between the party processes and indicate a changing status of one of the parties. The controller monitors the signaling messages and generates status information in response thereto while a processor receives the status information. The status information is made accessible to selected parties.

8 Claims, 3 Drawing Sheets

TELECOMMUNICATION SYSTEM FOR PROVIDING STATUS INFORMATION OF CONNECTED PARTIES HAVING ASSOCIATED PARTY PROCESSSES

This is a continuation of application Ser. No. 08/573,741, filed Dec. 18, 1995, now abandoned.

BACKGROUND OF THE INVENTION

1. Field of the Invention

The invention relates to a telecommunication exchange comprising control means for establishing and controlling connections between the parties that can be coupled to the telecommunication exchange and for transmitting status information about the parties to data processing means. These parties may be connected to the exchange both via an analog connection, digital connection, cordless connection and via a trunk line.

2. Discussions of the Related Art

Such a telecommunication exchange is known from the article "CSTA-Computer Supported Telecommunications Applications" by U. Gleinig, P. Redemann and L. Winkler, Nachrichtentechnik Elektronik, vol. 42 (1992), No. 3, pages 96–98. In this article a telecommunication system is described comprising a telecommunication exchange which is coupled via a so-termed Computer Telephony Interface (CTI) to data processing means, in this case formed by a single computer. This provides that the computer and the telecommunication exchange are each other's complement in the execution of a number of functions. To this end the telecommunication exchange transfers status information about the status of the parties to the computer. The computer transfers manipulation instructions for manipulating the connections between the parties to the telecommunication exchange. In the system described in this article, the interface is a so-termed Computer Supported Telecommunications Applications (CSTA) interface. This interface is standardized by the European Computer Manufacturers Association (ECMA). However, there are also other standardized interfaces, such as the Telephony Server Application Programming Interface (TSAPI, Novell Trademark).

In the cited document there is not discussed how that particular telecommunication exchange is rendered suitable for obtaining the status information and transmitting this status information to the data processing means.

SUMMARY OF THE INVENTION

It is an object of the invention to provide a telecommunication exchange as defined in the opening paragraph, which is simple and which has the potential of returning status information on all types of parties to the data processing means, so both on parties that can be connected to the telecommunication exchange by an analog connection and on parties that can be connected to the telecommunication exchange by a digital connection.

To this end, a telecommunication exchange according to the invention is characterized in that the control means are arranged for generating party processes related to the parties when a connection is set up, in that signalling messages can be exchanged between the party processes and in that the control means are further arranged for monitoring the signalling messages and generating the status information in response thereto. The party processes are software processes arranged for handling the input of the party and for effecting the signalling to the party. The type of party process depends on the type of party (digital/analog). The party processes mutually exchange signalling messages. By simply monitoring the signalling messages exchanged between the party processes, and converting these messages into the status information, the option of status information generation is made accessible to each type of party. In consequence, it is thus possible to obtain status information on all types of parties without extending the telecommunication exchange by additional hardware.

An embodiment for the telecommunication exchange according to the invention is characterized in that the signalling messages can be exchanged in accordance with a generic protocol. Generic is understood to mean that the protocol is the same for all types of party processes. As a result, for obtaining the status information about a party, it does not matter at all what type of party this is and the obtention of the status information is effected in the same manner for all types of parties.

A further embodiment for the telecommunication exchange according to the invention is characterized in that the control means are arranged for converting manipulation instructions coming from the data processing means for manipulating the connection between the particular parties into signalling messages. The party processes do not see any difference between signalling messages addressed to them coming from other party processes and signalling messages addressed to them obtained from a conversion of manipulation instructions. Therefore, for a party process belonging to a party, it does not make any difference whether the party to which it is connected is manipulated by an apparatus connected to the telecommunication exchange or by the data processing means. This means that in a telecommunication exchange according to the invention the parties can be manipulated in a simple manner both by an apparatus connected to the telecommunication exchange and by data processing means.

These and other aspects of the invention will be apparent from and elucidated with reference to the embodiments described hereafter.

DETAILED DESCRIPTION OF THE PREFERRED EMBODIMENTS

Figure 1:
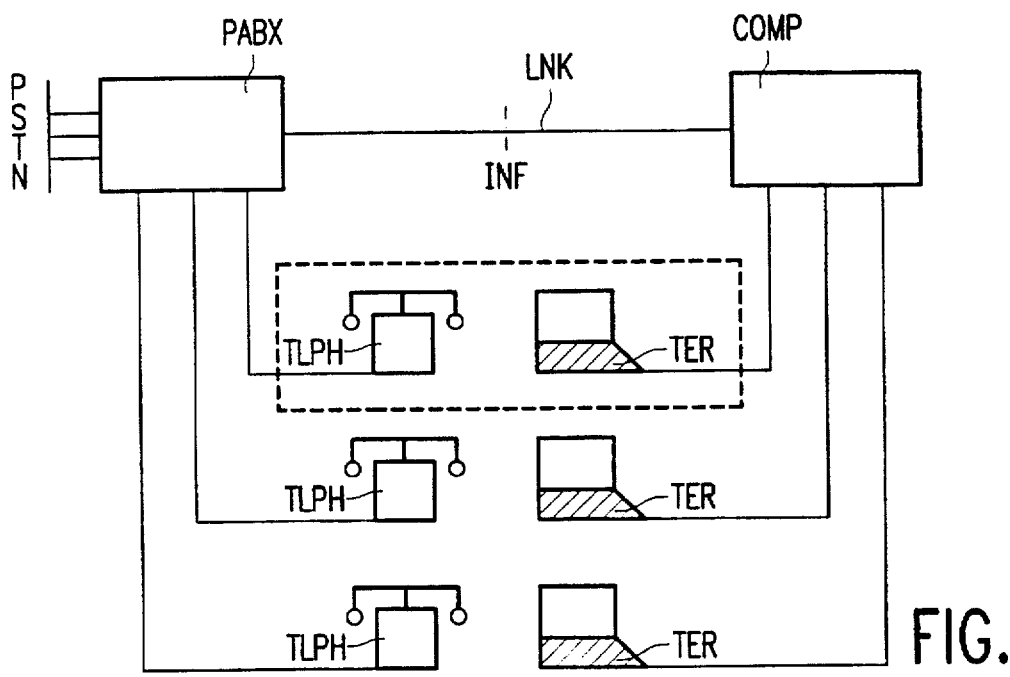
FIG. 1 shows a block diagram of a telecommunication system comprising a telecommunication exchange and data processing means.

FIG. 1 shows a block diagram of a telecommunication system. The system comprises a Private Automatic Branch Exchange PABX and data processing means COMP. The data processing means are formed here by a single computer, but may also be formed, as required, by a plurality of workstations linked to a local network. The telecommunication exchange is connected to the Public Switched Telecommunication Network PSTN. The exchange comprises a number of internal lines to which telephones TLPH are connected. These telephones may be analog, digital or cordless telephones, and so on. The telecommunication exchange is linked to the computer via link LNK. Messages are exchanged between the exchange and the computer via this link. The link forms the interface INF between the telecommunication exchange and the computer. There are various standards of this interface, such as, the Telephony Server Application Programming Interface (TSAPI, Novell Trademark) standard, and the Computer-Supported Telecommunications Applications (CSTA) standard. The semantics and the syntax of the CSTA-messages are standardized by the ECMA (European Computer Manufacturers Association) as described in ECMA standards 179 and 180. The telecommunication system shown in the drawing Figure has a CSTA-interface. Alternatively, however, the invention may also be applied to telecommunication systems which utilize interfaces that adhere to different standards.

Terminals TER are linked to the computer. The terminals TER and the telephones TLPH of the same user belong together. This is shown diagrammatically by a dashed line around a telephone and a terminal. The use of both terminal and telephone provides a large number of additional facilities to the user, as described in cited article.

Figure 2:
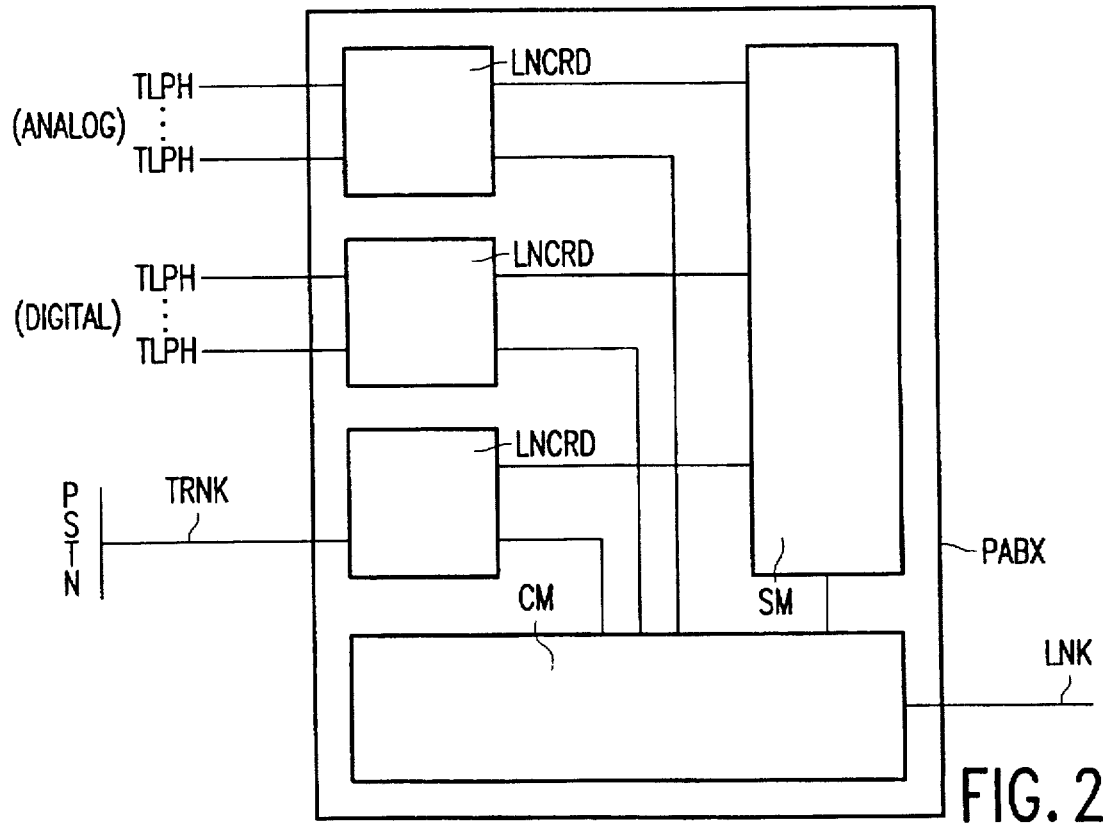
FIG. 2 shows a block diagram of a telecommunication exchange, FIG. 3 diagrammatically shows processes in the telecommunication exchange according to the invention if there is no CSTA-monitoring of the parties, FIG. 4 diagrammatically shows processes in the telecommunication exchange according to the invention if there is CSTA-monitoring for one of the parties, FIG. 5 diagrammatically shows processes in the telecommunication exchange according to the invention if there is CSTA-monitoring for both parties.

FIG. 2 shows a block diagram of a telecommunication exchange. The telecommunication exchange is formed by a plurality of line cards LNCRD, a switch module SM and control means CM. Subscriber lines as well as a trunk line TRNK for coupling the telecommunication exchange to the public network are connected to the line cards. All types of telephones, both digital and analog, can be connected to the subscriber lines. The control means comprise control software for setting up and controlling connections. The control means are coupled to the CSTA-link for exchanging with the computer the messages standardized by ECMA.

Figure 3:
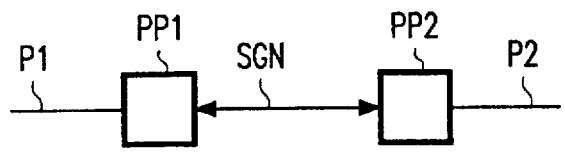

FIG. 3 diagrammatically shows processes in a telecommunication exchange according to the invention if no CSTA-monitoring takes place. Two parties P1, P2 are shown in the diagram. These parties may be connected to the exchange both via an analog, digital, cordless and, if a party seeks contact via the public telephone network, via a trunk line. In the control means the software of the party processes PP1, PP2 is set up. The party processes handle input signals coming from the parties, for example, going on-hook, going off-hook, dialling a number and so on. They also provide the signalling to the party, such as the engaged signal. As the party processes depend on the physical properties of the parties, there is a specific type of party process available to any type of party. Thus, analog parties are handled by analog party processes, digital parties by digital party processes, and so on. Signalling messages SGN indicating how the statuses of the parties change and what type of signalling the party processes are to send to the parties in reaction thereto, are exchanged between the party processes. Consequently, the party processes themselves can also have different statuses. The signalling messages and the party statuses are defined according to a proprietary telecommunication exchange protocol. This proprietary protocol is generic which is understood to mean that it is the same for all the types of party processes.

Figure 4:
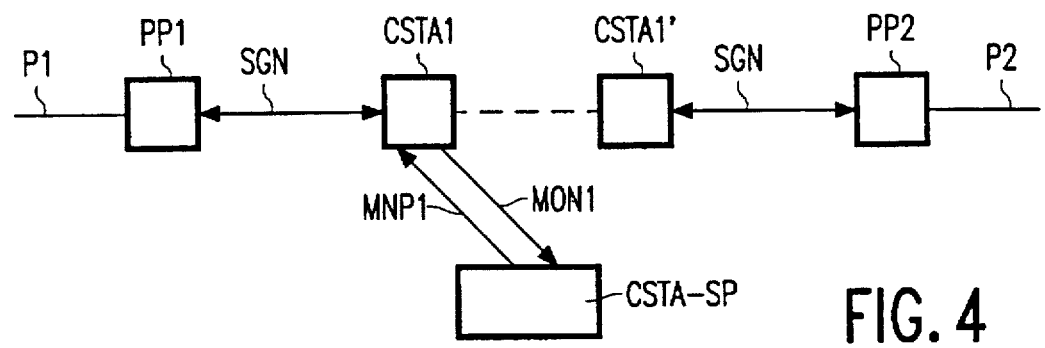

FIG. 4 diagrammatically shows processes in the telecommunication exchange according to the invention if CSTA-monitoring takes place for one of the parties. The control means monitor which parties are CSTA-monitored. If a party is CSTA-monitored and ends up in a non-idle status, the control means create a CSTA-process pair in addition to the party process belonging to the party. FIG. 4 represents the situation in which the first party P1 is monitored and a CSTA-process pair CSTA1, CSTA1' belonging to this party is created. This CSTA-process pair monitors the signalling messages exchanged between the party processes PP1, PP2 and converts them into status information MON1 which is sent to a continuously available static CSTA-process CSTA-SP for further processing. This static CSTA-process provides the transfer of status information via the CSTA-link to the computer. Seen from the party processes, the CSTA-processes simulate the other party processes belonging to the link. To the party processes there is no difference between communicating with another party process and communicating with a CSTA-process. Via the static CSTA-process, manipulation instructions MNP1 intended for manipulating the first party P1 are sent to the CSTA-process CSTA1. CSTA1 conveys these instructions to process CSTA1'. The latter converts the manipulation instructions into signalling messages and sends these signalling messages to the party process PP2 belonging to the second party P2. As the CSTA-process CSTA1' simulates a different party process from the party process PP2, party process PP2 does not notice whether the received signalling messages are generated by party process PP1, or by CSTA-process CSTA1'. In consequence, manipulating party 1 both by its telephone and by its computer is made possible in a simple manner.

The form of the status information and the manipulation instructions is defined in the ECMA standards 179 and 180. The CSTA-process pair is further arranged for transferring in a transparent manner the signalling messages coming from either party process to the other party process, which is diagrammatically shown in a dashed line.

Figure 5:
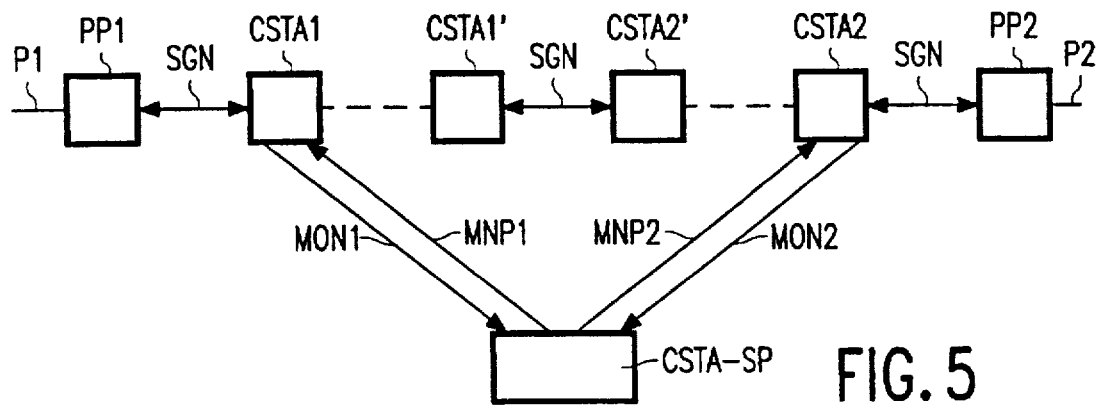

FIG. 5 diagrammatically shows processes in a telecommunication exchange according to the invention if CSTA-monitoring takes place for both parties. In this case party processes PP1, PP2 as well as CSTA-process pairs CSTA1, CSTA1', CSTA2, CSTA2' are created for both parties. Status information MON1 and manipulation instructions MNP1 of the first party P1 are exchanged between the static CSTA-process CSTA-SP and CSTA-process CSTA1. Status information MON2 and manipulation instructions MNP2 of the second party P2 are exchanged between the static CSTA-process CSTA-SP and CSTA-process CSTA2. Signalling messages are exchanged between CSTA-processes CSTA1' and CSTA2'. Both CSTA-processes simulate a party process and do not notice that they communicate with another CSTA-process. Furthermore, both CSTA-process pair CSTA1, CSTA1' and CSTA-process pair CSTA2, CSTA2' are arranged for transferring in a transparent manner signalling messages coming from the party processes.

Figure 6A:
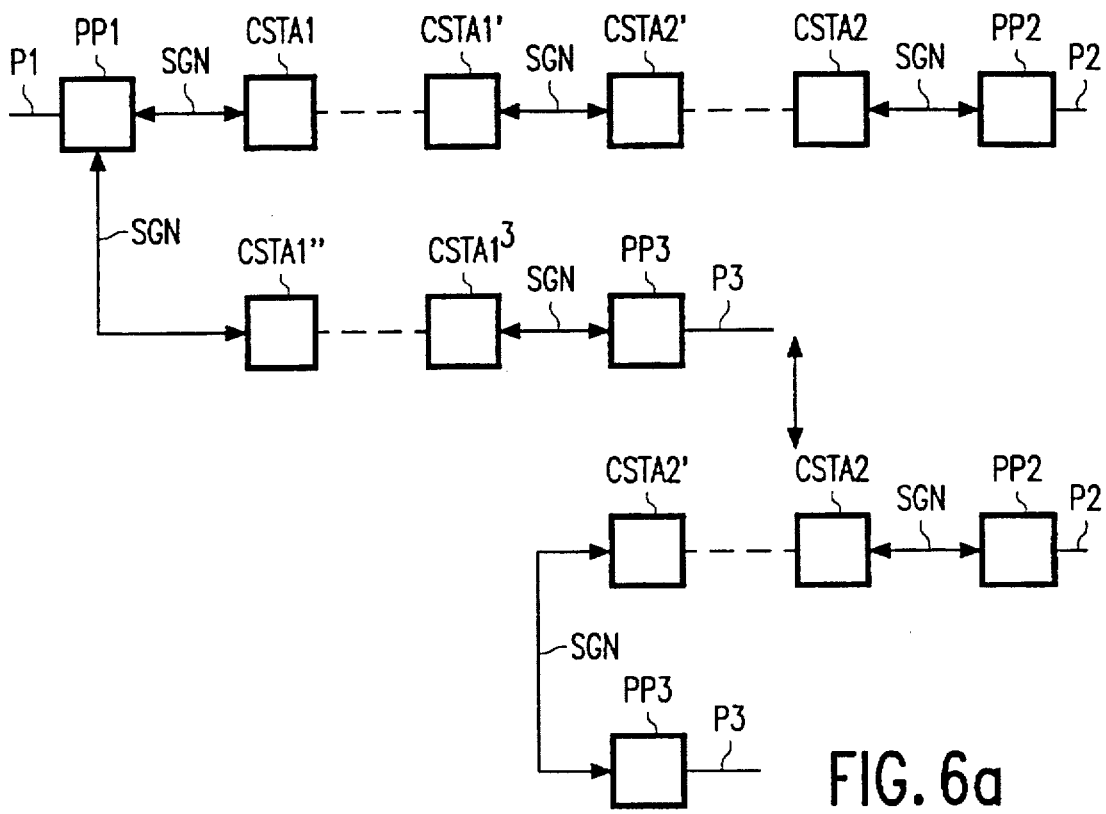
FIG. 6a shows processes in the case of a call transfer handled by the apparatus.

FIG. 6a shows processes for the case of an enquiry call transfer initiated via the telephone. There is a normal link set up between the first party P1 and the second party P2. Both parties are CSTA-monitored, thus in addition to the party process PP1, PP2, there is also the CSTA-process CSTA1, CSTA1', CSTA2, CSTA2' respectively, available to the two parties. The first party P1 wishes to connect the second party P2 to a third party P3. For this purpose, the first party itself is first to set up a link to this third party P3. This is done via its telephone. As the first party P1 is CSTA-monitored, there is also generated a CSTA-process pair CSTA1", CSTA1$^3$ for its link to the third party P3. After the link has been set up between the first party and the third party, the call transfer is effected, which operation leads to a link between the second party P2 and the third party P3. As the second party is CSTA-monitored, the CSTA-process pair CSTA2, CSTA2' belonging to this party is maintained.

Figure 6B:
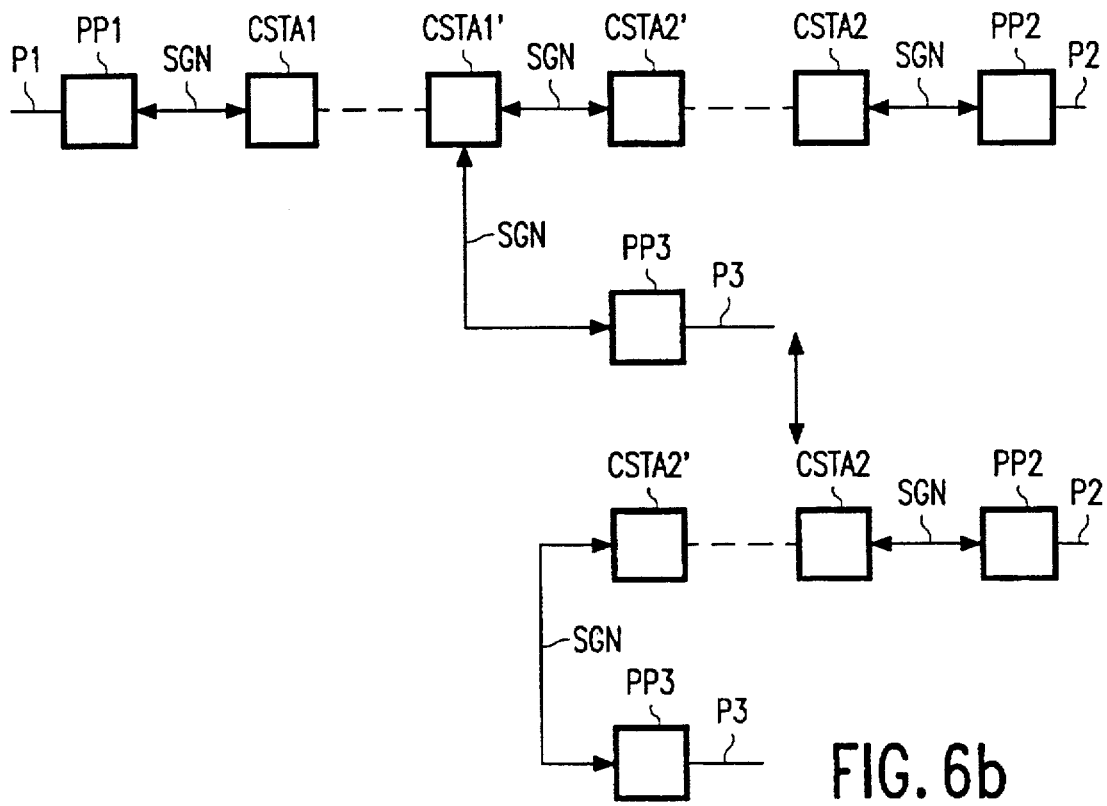
FIG. 6b shows processes in the case of a call transfer handled by the computer.

FIG. 6b shows processes in the case of an enquiry call transfer initiated via the computer. The difference from the situation as shown in FIG. 6a is that the link to the third party P3 is set up by applying manipulation instructions to the CSTA-process CSTA1'. This process has a direct communication with party process PP3. Therefore, in this case no additional CSTA-process pair belonging to the first party is created, as is done in the situation shown in FIG. 6a. The call transfer is effected by the computer which has CSTA-manipulation instructions, or because the telephone of party 1 goes on-hook. After the call transfer has been effected, the situation is similar to that shown in FIG. 6a.

We claim:

1. An integrated telecommunication exchange and data processing apparatus, comprising:

control means in a telecommunication exchange for establishing and controlling a communication link between any first and second parties connected to the telecommunication exchange, said parties being devices between which the telecommunication exchange creates the communication link, the first and second parties using first and second signaling protocols respectively which may be different from each other;

the control means generating first and second party processes corresponding to the first and second parties respectively, the first and second party processes being software processes for converting signal messages in the first and second signaling protocols respectively into signal messages in a generic signaling protocol and for converting signal messages in the generic signaling protocol into signal messages in the first and second signaling protocols respectively;

the control means monitoring signal messages in the generic protocol as the monitored signal messages pass between the first and second party processes and in response thereto generating status information indicative of the status of at least one of the first and second parties;

a data processing means for receiving the status information and for generating a manipulation instruction in response thereto in accordance with an application program running on the data processing means; and the control means receiving the manipulation instruction from the data processing means, converting the manipulation instruction into a signal message in the generic signaling protocol and sending the signal message converted from the manipulation instruction to one of the first and second parties to manipulate the communication link.

2. An integrated telecommunication exchange and data processing apparatus as in claim 1 wherein the status information is generated as a status message in a signaling protocol different from the generic signaling protocol and the manipulation instruction is generated in the same signaling protocol as the status message.

3. An integrated telecommunication exchange and data processing means as in claim 2 wherein the signaling protocol of the status information and the manipulation instruction are generated in the Computer Supported Telecommunications Applications (CSTA) protocol.

4. An integrated telecommunication exchange and data processing apparatus as in claim 1 wherein one of the first and second signaling protocols is an analog signaling protocol.

5. An integrated telecommunication exchange and data processing apparatus as in claim 4 wherein one of the first and second signaling protocols is a digital signaling protocol.

6. An integrated telecommunication exchange and data processing apparatus as in claim 1 wherein one of the first and second signaling protocols is a trunk signaling protocol.

7. An integrated telecommunication exchange and data processing apparatus as in claim 1 wherein said parties are telephones.

8. An integrated telecommunication exchange and data processing apparatus as in claim 1 wherein the control means generates a first and a second monitoring process for each party that is being monitored when the monitored party goes off-hook, the first monitoring process intercepting a signal message in the generic signaling protocol coming from the monitored party and converting the intercepted signal message into status information sent to the data processing apparatus, and the second monitoring process converting a manipulation instruction from the data processing apparatus into a signal message in the generic signaling protocol sent to the party intended to receive the intercepted signal message.

* * * * *